United States Patent
Yamamoto et al.

(10) Patent No.: US 8,573,710 B2
(45) Date of Patent: Nov. 5, 2013

(54) BRAKE CONTROL SYSTEM

(75) Inventors: Takayuki Yamamoto, Aichi-gun (JP);
Masaaki Komazawa, Miyoshi (JP);
Tetsuya Miyazaki, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 557 days.

(21) Appl. No.: 12/745,456

(22) PCT Filed: Nov. 20, 2008

(86) PCT No.: PCT/IB2008/003157
§ 371 (c)(1),
(2), (4) Date: May 28, 2010

(87) PCT Pub. No.: WO2009/068954
PCT Pub. Date: Jun. 4, 2009

(65) Prior Publication Data
US 2010/0301667 A1    Dec. 2, 2010

(30) Foreign Application Priority Data
Nov. 29, 2007    (JP) .................... 2007-308670

(51) Int. Cl.
*B60T 13/00* (2006.01)
(52) U.S. Cl.
USPC .................. 303/5; 303/116.1; 303/113.2
(58) Field of Classification Search
USPC .......... 303/113.1–113.4, 9.62, 140, 146, 155, 303/187, 186, 116.1–116.4
See application file for complete search history.

(56) References Cited

U.S. PATENT DOCUMENTS

| 3,521,934 | A | 7/1970 | Leiber |
| 6,913,326 | B1 * | 7/2005 | Ohkubo et al. ............ 303/11 |
| 6,957,870 | B2 * | 10/2005 | Kagawa et al. ........... 303/113.4 |
| 2001/0006306 | A1 * | 7/2001 | Kagawa et al. ............ 303/20 |
| 2001/0022254 | A1 | 9/2001 | Hofmann et al. |
| 2001/0038243 | A1 * | 11/2001 | Isono ...................... 303/116.1 |
| 2002/0149259 | A1 * | 10/2002 | Otomo et al. ............... 303/3 |
| 2004/0212246 | A1 | 10/2004 | Kamiya et al. |
| 2006/0238024 | A1 * | 10/2006 | Akita ........................ 303/155 |
| 2007/0108837 | A1 * | 5/2007 | Ohkubo et al. ......... 303/122.08 |
| 2007/0252428 | A1 * | 11/2007 | Okano et al. ............ 303/113.1 |

FOREIGN PATENT DOCUMENTS

| DE | 40 14 052 | 11/1991 |
| DE | 40 29 793 | 3/1992 |
| DE | 199 63 760 A1 | 7/2001 |
| GB | 2 234 027 | 1/1991 |

(Continued)

OTHER PUBLICATIONS

German Office Action issued Jan. 31, 2012, in German Patent Application No. 11 2008 003 265.3 with English translation.

*Primary Examiner* — Robert A Siconolfi
*Assistant Examiner* — James Hsiao
(74) *Attorney, Agent, or Firm* — Oblon, Spivak, McClelland, Maier & Neustadt, L.L.P.

(57) ABSTRACT

In a brake control system (10), a reservoir switch (60) detects a decrease in the amount of hydraulic fluid in a reservoir tank (26). An ECU (100) switches a master cutoff valve (22), a pressure increase valve (40), and a pressure decrease valve (42) and the like between open and closed. When a decrease in the amount of hydraulic fluid in the reservoir tank (26) is detected, the ECU (100) opens the master cutoff valve (22) to supply hydraulic fluid from a right front-wheel wheel cylinder (20FR) and a left front-wheel wheel cylinder (20FL) to a master cylinder (14), when release of a brake pedal (12) is detected.

11 Claims, 3 Drawing Sheets

(56) References Cited

FOREIGN PATENT DOCUMENTS

| | | |
|---|---|---|
| JP | 10 181575 | 7/1998 |
| JP | 10 244916 | 9/1998 |
| JP | 11 115739 | 4/1999 |
| JP | 2004 322843 | 11/2004 |
| JP | 2006 137221 | 6/2006 |

* cited by examiner

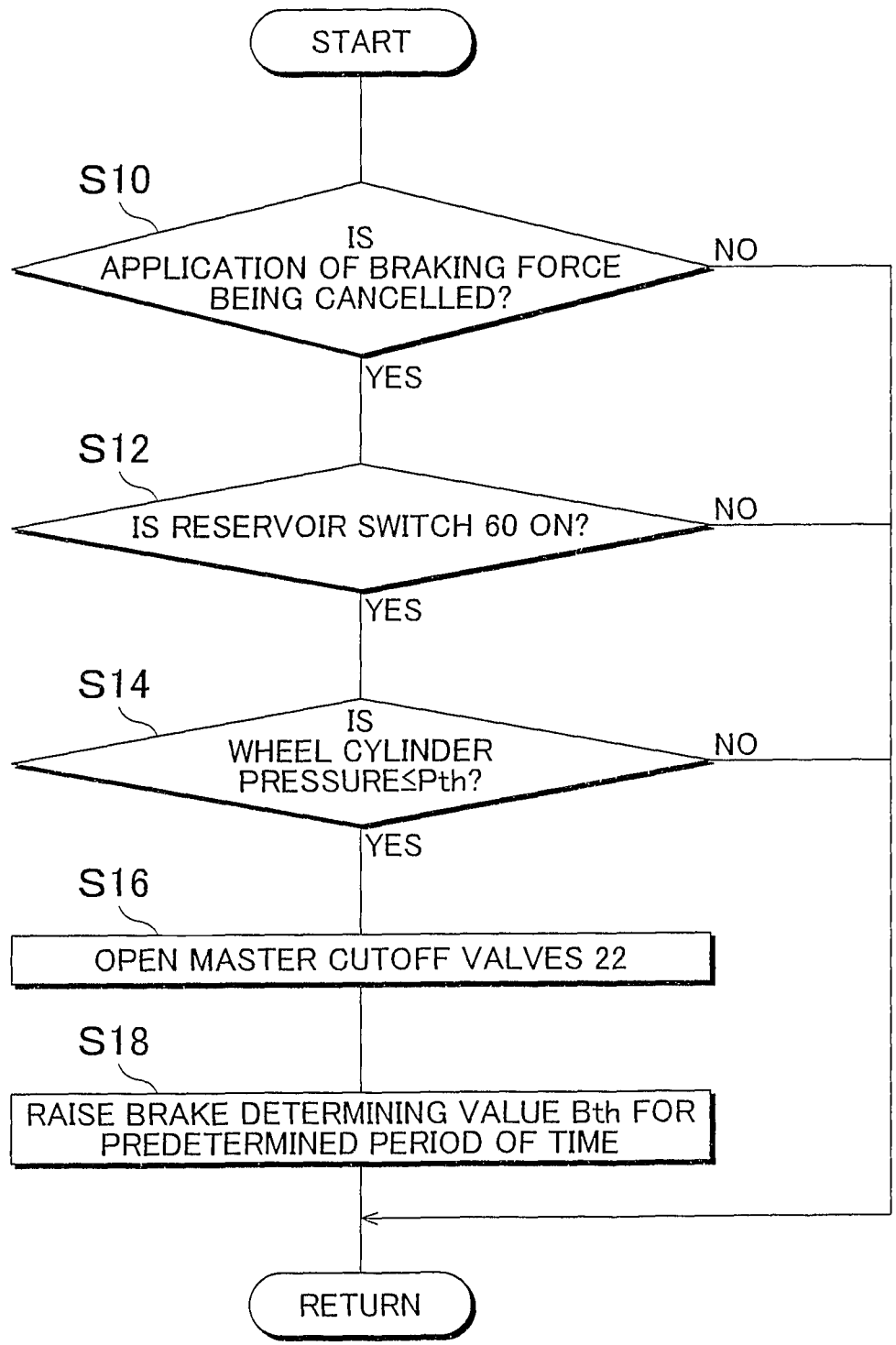

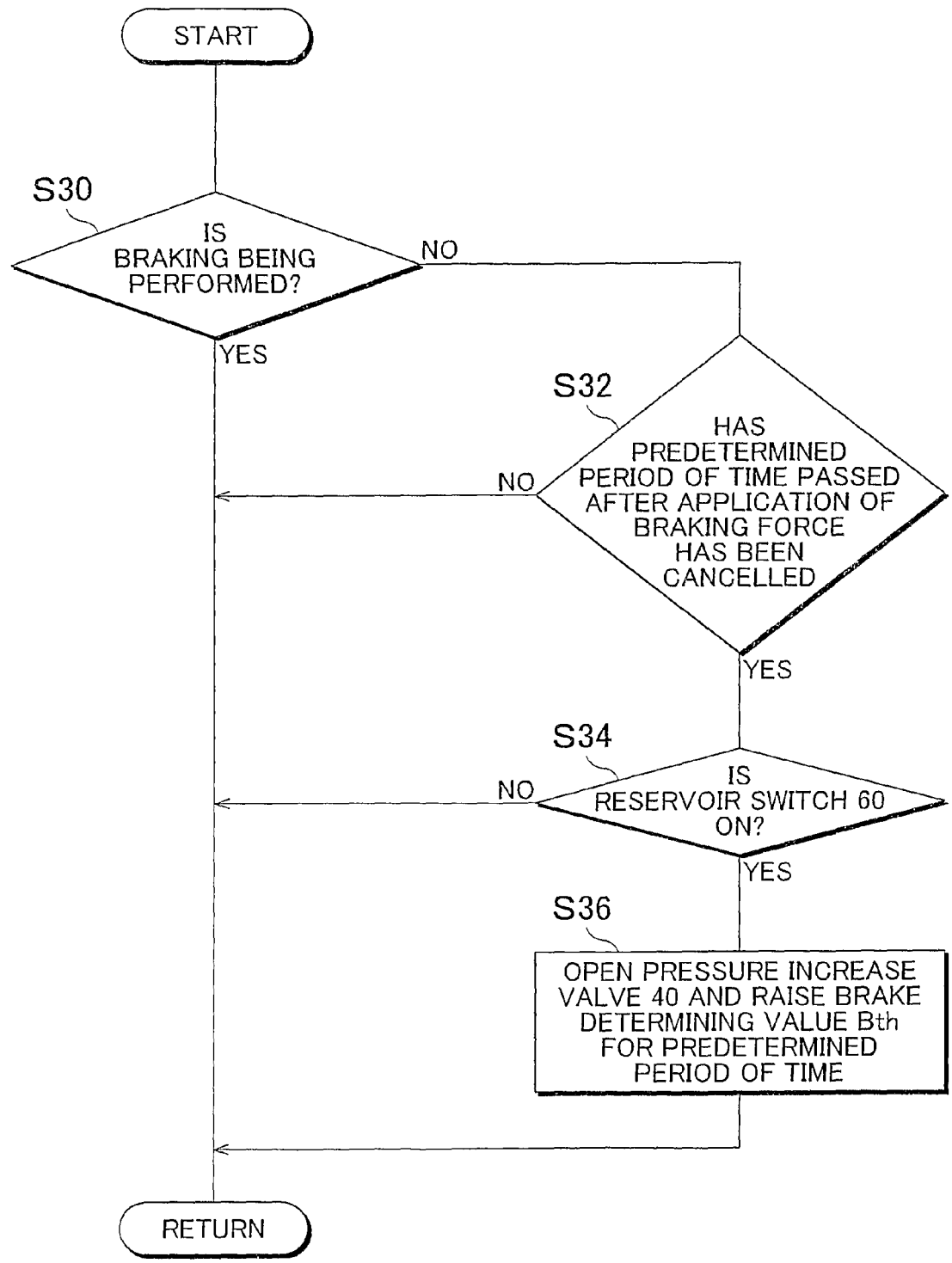

BRAKE CONTROL SYSTEM

BACKGROUND OF THE INVENTION

1. Field of the Invention

The invention relates to a brake control system. More particularly, the invention relates to a brake control system that controls braking force applied to a wheel by switching a valve interposed in a hydraulic fluid path between being open and closed.

2. Description of the Related Art

In recent years there has been much progress in the development of electronically controlled brake systems that aim to improve running stability and vehicle safety by electronically controlling the braking force applied to each of a plurality of wheels of a vehicle. These electronically controlled brake systems control the wheel cylinder pressure to apply the optimum braking force to each wheel by controlling a plurality of valves interposed in a hydraulic fluid path between being open and closed. One example of such an electronically controlled brake system is the vehicular brake system disclosed in Japanese Patent Application Publication No. 2004-322843 (JP-A-2004-322843), which has a master cutoff valve that is a normally open valve, which is open when the brake is not applied and closed when the brake is applied.

With the vehicular brake system described in JP-A-2004-322843, hydraulic fluid (i.e., brake fluid) supplied to a wheel cylinder is returned to a reservoir tank via a pressure decrease linear valve when the brake is released from an applied state. In this case, if there is a brake fluid leak at a caliper, for example, less brake fluid will return to the reservoir tank. Also, there is some variation in the amount of brake fluid in the reservoir tank when the vehicle leaves the factory and some vehicles may be shipped from the factory with a relatively small amount of brake fluid in the reservoir tank. In addition, a brake system normally includes a mechanism that adjusts the position of the piston as the brake pads wear, and thereby the amount of brake fluid stored in the caliper increases as the pads wear. Further, low temperatures cause brake fluid to contract, reducing its volume. Therefore, even if there is no brake fluid leak, there may be less brake fluid in the reservoir tank. Less brake fluid in the reservoir tank may result in less brake fluid in the master cylinder, which may in turn affect the operability of the brake pedal by the driver.

SUMMARY OF THE INVENTION

One object of the present invention is to overcome drawbacks in the background art and to suppress a decrease in hydraulic fluid supplied to a master cylinder that occurs as a result of a decrease in hydraulic fluid in a reservoir tank.

A first aspect of the invention relates to a brake control system that includes a hydraulic fluid decrease detecting portion that detects a decrease in the amount of hydraulic fluid in a reservoir tank, and a valve opening and closing controlling portion that switches at least one valve arranged in a hydraulic fluid path between being open and closed. The at least one valve includes a first valve interposed in a hydraulic fluid path that connects a master cylinder with a hydraulic fluid storing portion in which the hydraulic pressure of stored hydraulic fluid is higher than the hydraulic pressure of the master cylinder. When a decrease in the amount of hydraulic fluid in the reservoir tank is detected, the valve opening and closing controlling portion opens the first valve to supply hydraulic fluid to the master cylinder from the hydraulic fluid storing portion.

According to this first exemplary aspect, even if the amount of hydraulic fluid in the reservoir tank has decreased, it is possible to suppress a decrease in the amount of hydraulic fluid supplied to the master cylinder, and thus to suppress an affect on brake pedal operability felt by the driver.

In the first aspect described above, the brake control system may also include a brake operation detecting portion that detects depression and release of a brake pedal. Also, the hydraulic fluid storing portion may include a wheel cylinder. Further, the at least one valve may include at least one master cutoff valve interposed in a hydraulic fluid path that connects the master cylinder with the wheel cylinder. Further, when a decrease in the amount of hydraulic fluid in the reservoir tank is detected by the hydraulic fluid decrease detecting portion, the valve opening and closing controlling portion may open the at least one master cutoff valve to supply hydraulic fluid to the master cylinder from the wheel cylinder that is connected to the master cutoff valve when release of the brake pedal is detected.

When the brake is being applied, the wheel cylinder pressure is higher than the master cylinder pressure. Therefore, according to the structure described above, when a decrease in the amount of hydraulic fluid in the reservoir tank is detected, this wheel cylinder pressure can be used to supply hydraulic fluid to the master cylinder. As a result, it is easy to suppress a decrease in the amount of hydraulic fluid in the master cylinder.

In the foregoing structure, the at least one valve may further include a pressure decrease valve, which is interposed in a hydraulic fluid path that connects the reservoir tank with the wheel cylinder, and the valve opening and closing portions opens the pressure decrease valve to decrease a wheel cylinder pressure when release of the brake pedal is detected, and open the at least one master cutoff valve when the wheel cylinder pressure drops to a predetermined pressure threshold value.

According to this structure, the master cutoff valve is opened after the difference between the wheel cylinder pressure and the master cylinder pressure has been reduced, making it possible to avoid hydraulic fluid from suddenly being supplied to the master cylinder. As a result, an appropriate amount of hydraulic fluid can be supplied to the master cylinder.

In the foregoing structure, the at least one master cutoff valve may be a linear valve. Moreover, the brake control system may also include a wheel cylinder pressure sensor that detects the wheel cylinder pressure by detecting the hydraulic pressure in a hydraulic fluid path from the at least one master cutoff valve interposed in the hydraulic fluid path that connects the wheel cylinder with the master cylinder, to the wheel cylinder. Further, the at least one valve may include a pressure decrease valve, which is interposed in a hydraulic fluid path that connects the wheel cylinder with the reservoir tank, and the valve opening and closing portions may open the pressure decrease valve to decrease the wheel cylinder pressure when release of the brake pedal has been detected, and may gradually open the master cutoff valve wider as the wheel cylinder pressure detected by the wheel cylinder pressure sensor decreases.

In the first aspect described above, the brake control system may also include a brake operation detecting portion that detects depression and release of a brake pedal. Also, the hydraulic fluid storing portion may include an accumulator. Further, the at least one valve may include i) a pressure increase valve interposed in a hydraulic fluid path that connects the accumulator with a wheel cylinder and ii) at least one master cutoff valve interposed in a hydraulic fluid path that connects the pressure increase valve with a master cylinder. Further, when a decrease in the amount of hydraulic fluid in the reservoir tank is detected, the valve opening and closing controlling portion may open the pressure increase valve and the master cutoff valve to supply hydraulic fluid from the accumulator to the master cylinder when depression of the brake pedal is not detected.

The accumulator pressure is normally higher than the master cylinder pressure. Therefore, according to this structure, when a decrease in the amount of hydraulic fluid in the reservoir tank is detected, this accumulator pressure can be used to supply hydraulic fluid to the master cylinder. As a result, it is easy to suppress a decrease in the amount of hydraulic fluid in the master cylinder.

In the structure described above, the brake control system may also include a master cylinder pressure sensor that detects a master cylinder pressure by detecting hydraulic pressure in a hydraulic fluid path from at least one master cutoff valve, which is interposed in the hydraulic fluid path that connects a wheel cylinder with the master cylinder, to the master cylinder. Further, the at least one valve may include a pressure increase valve interposed in the hydraulic fluid path that connects the accumulator with the wheel cylinder. Further, when a decrease in the amount of hydraulic fluid in the reservoir tank is not detected, the valve opening and closing controlling portion may determine that the brake pedal is being depressed when a master cylinder pressure exceeding a first pressure threshold value is detected, and open the pressure increase valve to increase the wheel cylinder pressure. Also, when a decrease in the amount of hydraulic fluid in the reservoir tank is detected, the valve opening and closing controlling portion may determine that the brake pedal is being depressed when a master cylinder pressure exceeding a second pressure threshold value that is higher than the first pressure threshold value is detected while the first valve that is interposed in the hydraulic fluid path that connects the hydraulic fluid storing portion with the master cylinder is open, and open the pressure increase valve to increase the wheel cylinder pressure.

When hydraulic fluid is supplied to the master cylinder through the hydraulic fluid path, the hydraulic pressure in the hydraulic fluid path may become higher than the hydraulic pressure in the master cylinder. Therefore, when the master cylinder pressure is detected by detecting the hydraulic pressure in the hydraulic fluid path that is connected to the master cylinder instead of by detecting the hydraulic pressure inside the master cylinder, the detected hydraulic pressure may be higher than the actual hydraulic pressure in the master cylinder. Therefore, the foregoing structure switches the pressure threshold value during the period of time when it is possible that a hydraulic pressure higher than the actual hydraulic pressure in the master cylinder may be detected in this way to more accurately determine whether or not the brake pedal is being depressed.

A second aspect of the invention relates to a brake control system that includes means for detecting a decrease in hydraulic fluid in a reservoir tank, and means for switching at least one valve interposed in a hydraulic fluid path between being open and closed. The at least one valve includes a first valve interposed in a hydraulic fluid path that connects a master cylinder with a hydraulic fluid storing portion in which the hydraulic pressure of stored hydraulic fluid is higher than the hydraulic pressure of the master cylinder. Also, when a decrease in the amount of hydraulic fluid in the reservoir tank is detected, the means for switching opens the first valve to supply hydraulic fluid from the hydraulic fluid storing portion to the master cylinder.

A third aspect of the invention relates to a brake control method that includes detecting a decrease in the amount of hydraulic fluid in a reservoir tank, and switching at least one valve arranged in a hydraulic fluid path between being open and closed. The at least one valve includes a first valve interposed in a hydraulic fluid path that connects a master cylinder with a hydraulic fluid storing portion in which the hydraulic pressure of stored hydraulic fluid is higher than the hydraulic pressure of the master cylinder. When a decrease in the amount of hydraulic fluid in the reservoir tank is detected, the first valve is opened to supply hydraulic fluid from the hydraulic fluid storing portion to the master cylinder.

In the third aspect described above, the brake control method may also include detecting depression and release of a brake pedal. Also, the hydraulic fluid storing portion may include a wheel cylinder. Further, the at least one valve may include at least one master cutoff valve interposed in a hydraulic fluid path that connects the master cylinder with the wheel cylinder. Further, when a decrease in the amount of hydraulic fluid in the reservoir tank is detected, in the switching at least one valve, the at least one master cutoff valve may be opened to supply hydraulic fluid to the master cylinder from the wheel cylinder that is connected to the master cutoff valve when release of the brake pedal is detected.

In the foregoing aspect, the at least one valve may further include a pressure decrease valve, which is interposed in a hydraulic fluid path that connects the reservoir tank with the wheel cylinder, and in the switching at least one valve, the pressure decrease valve may be opened to decrease a wheel cylinder pressure when release of the brake pedal is detected, and the at least one master cutoff valve may be opened when the wheel cylinder pressure drops to a predetermined pressure threshold value.

In the foregoing aspect, the at least one master cutoff valve may be a linear valve. Moreover, the brake control method may also include detecting the wheel cylinder pressure by detecting the hydraulic pressure in a hydraulic fluid path from the at least one master cutoff valve interposed in the hydraulic fluid path that connects the wheel cylinder with the master cylinder, to the wheel cylinder. Further, the at least one valve may include a pressure decrease valve, which is interposed in a hydraulic fluid path that connects the wheel cylinder with the reservoir tank, and in the switching at lease one valve, the pressure decrease valve may be opened to decrease the wheel cylinder pressure when release of the brake pedal has been detected, and the at least one master cutoff valve may be gradually opened wider as the wheel cylinder pressure detected by the wheel cylinder pressure sensor decreases.

In the third aspect described above, the brake control method may also include detecting depression and release of a brake pedal. Also, the hydraulic fluid storing portion may include an accumulator. Further, the at least one valve may include i) a pressure increase valve interposed in a hydraulic fluid path that connects the accumulator with a wheel cylinder and ii) at least one master cutoff valve interposed in a hydraulic fluid path that connects the pressure increase valve with a master cylinder. Further, when a decrease in the amount of hydraulic fluid in the reservoir tank is detected, in the switching at least one valve, the pressure increase valve and the master cutoff valve may be opened to supply hydraulic fluid from the accumulator to the master cylinder when depression of the brake pedal is not detected.

In the third aspect described above, the brake control method may also include detecting a master cylinder pressure by detecting hydraulic pressure in a hydraulic fluid path from at least one master cutoff valve, which is interposed in the hydraulic fluid path that connects a wheel cylinder with the master cylinder, to the master cylinder. Further, the at least one valve may include a pressure increase valve interposed in the hydraulic fluid path that connects the accumulator with the wheel cylinder. Further, when a decrease in the amount of hydraulic fluid in the reservoir tank is not detected, in the switching at least one valve, it may be determined that the brake pedal is being depressed when a master cylinder pressure exceeding a first pressure threshold value is detected, and the pressure increase valve may be opened to increase the wheel cylinder pressure. Also, when a decrease in the amount of hydraulic fluid in the reservoir tank is detected, in the switching at least one valve, it may be determined that the brake pedal is being depressed when a master cylinder pressure exceeding a second pressure threshold value that is higher than the first pressure threshold value is detected while the first valve that is interposed in the hydraulic fluid path that connects the hydraulic fluid storing portion with the master cylinder is open, and the pressure increase valve may be opened to increase the wheel cylinder pressure.

This aspect makes it possible to suppress a decrease in hydraulic fluid supplied to a master cylinder that occurs as a result of a decrease in hydraulic fluid in a reservoir tank.

As should be apparent, the invention can provide a number of advantageous features and benefits. It is to be understood that, in practicing the invention, an embodiment can be constructed to include one or more features or benefits of embodiments disclosed herein, but not others. Accordingly, it is to be understood that the preferred embodiments discussed herein are provided as examples and are not to be construed as limiting, particularly since embodiments can be formed to practice the invention that do not include each of the features of the disclosed examples.

BRIEF DESCRIPTION OF THE DRAWINGS

The foregoing and further objects, features and advantages of the invention will become apparent from the following description of example embodiments with reference to the accompanying drawings, wherein like numerals are used to represent like elements and wherein:

FIG. 2 is a flowchart illustrating a routine for a control to supply brake fluid to a master cylinder according to the first example embodiment of the invention; and FIG. 3 is a flowchart illustrating a routine for a control to supply brake fluid to a master cylinder according to a second example embodiment of the invention.

DETAILED DESCRIPTION OF THE EMBODIMENTS

Figure 1:
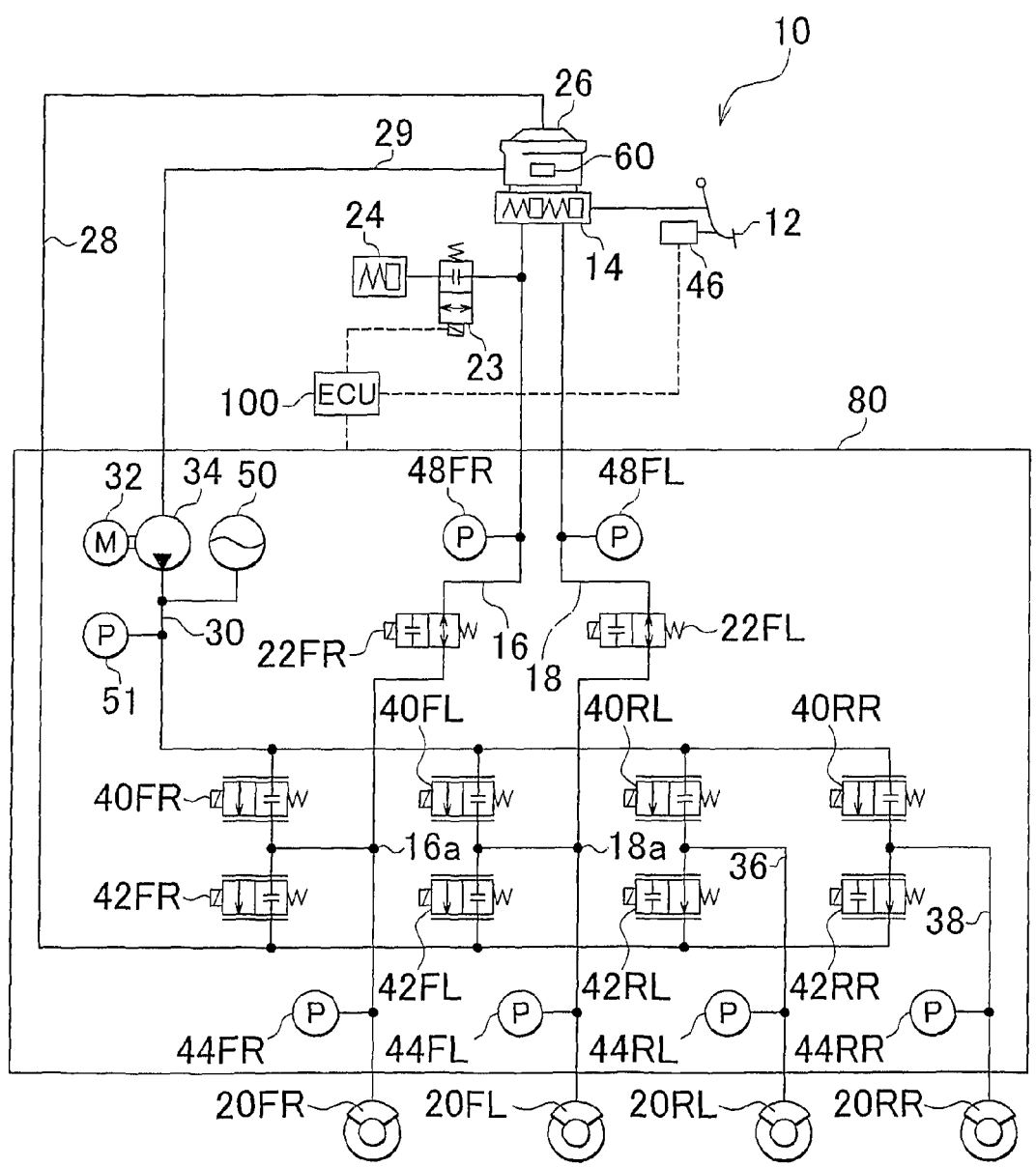
FIG. 1 is a schematic diagram of a brake control system according to a first example embodiment of the invention.

Hereinafter, an example embodiment of the invention will be described in detail with reference to the accompanying drawings.

First, a first example embodiment of the invention will be described. FIG. 1 is a schematic diagram of a brake control system 10 according to the first example embodiment of the invention. This brake control system 10 employs an electronically controlled brake (ECB) system that independently and optimally sets the braking force applied to each of four wheels of a vehicle in response to an operation of a brake pedal 12 by a driver.

The brake pedal 12 is connected to a master cylinder 14 that discharges brake fluid, i.e., hydraulic fluid, according to a depression operation performed by the driver. Also, a stroke sensor 46 that detects the depression stroke is provided with the brake pedal 12.

A reservoir tank 26 is connected to the master cylinder 14. This master cylinder 14 includes two outlet ports, one for the right front wheel and one for the left front wheel. Brake fluid is supplied to these two outlet ports from the reservoir tank 26. One of the outlet ports of the master cylinder 14 is connected via an electromagnetic valve 23 to a stroke simulator 24 that generates a reaction force corresponding to the operating force with which the brake pedal 12 is depressed by the driver. The electromagnetic valve 23 is a so-called normally closed linear valve that is closed when no current is supplied and is open when current is supplied in response to a detected depression operation of the brake pedal 12 by the driver.

A first brake pressure control line 16 is connected to the right front wheel port of the master cylinder 14. The first brake pressure control line 16 is connected to a right front-wheel wheel cylinder 20FR that applies a braking force to the right front wheel. Similarly, a second brake pressure control line 18 is connected to the left front wheel port of the master cylinder 14. The second brake pressure control line 18 is connected to a left front-wheel wheel cylinder 20FL that applies a braking force to the left front wheel.

A right master cutoff valve 22FR is provided midway in the first brake pressure control line 16, and a left master cutoff valve 22FL is provided midway in the second brake pressure control line 18. Hereinafter, the right master cutoff valve 22FR and the left master cutoff valve 22FL will be collectively referred to as "master cutoff valves 22" where appropriate. The master cutoff valves 22 are both so-called normally open valves. When current is supplied to the master cutoff valves 22, they are closed, thereby preventing brake fluid from flowing between the master cylinder 14 and the right front-wheel wheel cylinder 20FR and between the master cylinder 14 and the left front-wheel wheel cylinder 20FL. When the flow of current stops, the master cutoff valves 22 open, thereby allowing brake fluid to flow between the master cylinder 14 and the right front-wheel wheel cylinder 20FR and between the master cylinder 14 and the left front-wheel wheel cylinder 20FL.

Further, a right master pressure sensor 48FR is provided between the right front wheel port of the master cylinder 14 and the right master cutoff valve 22FR in the first brake pressure control line 16. This right master pressure sensor 48FR detects the master cylinder pressure of the right front wheel port of the master cylinder 14 by detecting the hydraulic pressure in the first brake pressure control line 16 between the right front wheel port of the master cylinder 14 and the right master cutoff valve 22FR.

Similarly, a left master pressure sensor 48FL is provided between the left front wheel port of the master cylinder 14 and the left master cutoff valve 22FL in the second brake pressure control line 18. This left master pressure sensor 48FL detects the master cylinder pressure of the left front wheel port of the master cylinder 14 by detecting the hydraulic pressure in the second brake pressure control line 18 between the left front wheel port of the master cylinder 14 and the left master cutoff valve 22FL.

One end of a brake fluid feed line 29 is connected to the reservoir tank 26. The other end of this brake fluid feed line 29 is connected to an inlet of a pump 34 that is driven by a motor 32. An outlet of the pump 34 is connected to a high pressure line 30. An accumulator 50 is also connected to this high pressure line 30. In this first example embodiment, the pump 34 is a reciprocating pump that includes a piston, not shown, that is driven in a reciprocating fashion by the motor 32. Also, the accumulator 50 in this example embodiment is an accumulator that converts the pressure energy of the brake fluid into pressure energy of a filler gas such as nitrogen and stores the pressurized brake fluid.

The accumulator 50 stores brake fluid that has been pressurized by the pump 34. Also, an accumulator pressure sensor 51 that detects the outlet pressure of the accumulator 50, i.e., the pressure of brake fluid in the accumulator 50, is provided in the high pressure line 30.

The high pressure line 30 is connected to a right front wheel pressure increase valve 40FR, a left front wheel pressure increase valve 40FL, a left rear wheel pressure increase valve 40RL, and a right rear wheel pressure increase valve 40RR (hereinafter, these will collectively be referred to as "pressure increase valves 40" where appropriate). The right front wheel pressure increase valve 40FR is connected to a junction 16a between the right master cutoff valve 22FR and the right front-wheel wheel cylinder 20FR in the first brake pressure control line 16. Similarly, the left front wheel pressure increase valve 40FL is connected to a junction 18a between the left master cutoff valve 22FL and the left front-wheel wheel cylinder 20FL in the second brake pressure control line 18. The left rear wheel pressure increase valve 40RL is connected to a left rear wheel pressure control line 36 that is connected to the left rear-wheel wheel cylinder 20RL. The right rear wheel pressure increase valve 40RR is connected to a right rear wheel pressure control line 38 that is connected to the right rear-wheel wheel cylinder 20RR.

Each of the pressure increase valves 40 is a so-called normally closed linear valve (electromagnetic valve) that is closed when no current is being supplied, thereby cutting off communication between the accumulator 50 and the wheel cylinders 20. As a result, brake fluid is prevented from being supplied from the accumulator 50 to the wheel cylinders 20 so the wheel cylinder pressure will not rise. When current is supplied, the pressure increase valves 40 open by an amount corresponding to the current flowing through them, thereby opening communication between the accumulator 50 and the wheel cylinders to which the pressure increase valves 40 are connected. Accordingly, brake fluid is supplied to the wheel cylinders 20 from the accumulator 50 such that the wheel cylinder pressure rises.

The right front-wheel wheel cylinder 20FR is connected to a right front wheel pressure decrease valve 42FR, the left front-wheel wheel cylinder 20FL is connected to a left front wheel pressure decrease valve 42FL, the left rear-wheel wheel cylinder 20RL is connected to a left rear wheel pressure decrease valve 42RL, and the right rear-wheel wheel cylinder 20RR is connected to a right rear wheel pressure decrease valve 42RR. Hereafter, these pressure decrease valves will collectively be referred to as "pressure decrease valves 42" where appropriate. Each of the pressure decrease valves 42 is connected to a brake line 28, which is in turn connected to the reservoir tank 26.

The right front wheel pressure decrease valve 42FR and the left front wheel pressure decrease valve 42FL are so-called normally closed linear valves that are closed when no current is being supplied, thereby preventing communication between the right front-wheel wheel cylinder 20FR and the reservoir tank 26, and between the left front-wheel wheel cylinder 20FL and the reservoir tank 26. Accordingly, brake fluid is prevented from draining out of the right front-wheel wheel cylinder 20FR and the left front-wheel wheel cylinder 20FL into the reservoir tank 26 so the pressure in these wheel cylinders 20FR, 20FL will not decrease. When current is supplied, the right front wheel pressure decrease valve 42FR and the left front wheel pressure decrease valve 42FL open by an amount corresponding to the current flowing through them, thereby opening communication between the right front-wheel wheel cylinder 20FR and the reservoir tank 26, and between the left front-wheel wheel cylinder 20FL and the reservoir tank 26. As a result, brake fluid drains from the right front-wheel wheel cylinder 20FR and the left front-wheel wheel cylinder 20FL into the reservoir tank 26 such that the pressure in those wheel cylinders 20FR, 20FL decreases.

Similarly, the left rear wheel pressure decrease valve 42RL and the right rear wheel pressure decrease valve 42RR are so-called normally open linear valves (electromagnetic valves) that are closed when current is being supplied, thereby preventing communication between the left rear-wheel wheel cylinder 20RL and the reservoir tank 26, and between the right rear-wheel wheel cylinder 2RR and the reservoir tank 26. Accordingly, brake fluid is prevented from draining out of the left rear-wheel wheel cylinder 20RL and the right rear-wheel wheel cylinder 20RR to the reservoir tank 26 so the pressure in these wheel cylinders 20RR, 20RL will not decrease. When the current supplied to the left rear wheel pressure decrease valve 42RL and the right rear wheel pressure decrease valve 42RR is reduced or stopped, those pressure decrease valves (i.e., 42RL and 42RR) open, thereby opening communication between the left rear-wheel wheel cylinder 20RL and the reservoir tank 26, and between the right rear-wheel wheel cylinder 20RR and the reservoir tank 26. As a result, brake fluid returns from the left rear-wheel wheel cylinder 20RL and the right rear-wheel wheel cylinder 20RR to the reservoir tank 26 such that the pressure in the left rear-wheel wheel cylinder 20RL and the pressure in the right rear-wheel wheel cylinder 20RR decrease.

Wheel cylinder pressure sensors 44FR, 44FL, 44RR, 44RL are provided in hydraulic lines that are connected to the wheel cylinders. That is, a right front-wheel wheel cylinder pressure sensor 44FR is provided in the hydraulic line that is connected to the right front-wheel wheel cylinder 20FR, a left front-wheel wheel cylinder pressure sensor 44FL is provided in the hydraulic line that is connected to the left front-wheel wheel cylinder 20FL, a left rear-wheel wheel cylinder pressure sensor 44RL is provided in the hydraulic line that is connected to the left rear-wheel wheel cylinder 20RL, and a right rear-wheel wheel cylinder pressure sensor 44RR is provided in the hydraulic line that is connected to the right rear-wheel wheel cylinder 20RR. Hereinafter, these wheel cylinder pressure sensors will collectively be referred to as "wheel cylinder pressure sensors 44" when appropriate. These wheel cylinder pressure sensors 44 detect the respective wheel cylinder pressure in the corresponding wheel cylinders 20.

The master cutoff valves 22, the pressure increase valves 40, the pressure decrease valves 42, the pump 34, the accumulator 50, the master pressure sensors 48, the wheel cylinder pressure sensors 44, and the accumulator pressure sensor 51 are all part of a hydraulic pressure actuator 80. An electronic control unit (hereinafter simply referred to as "ECU") 100 includes a CPU (not shown) that executes various operations, a ROM (not shown) in which various control programs are stored, and a RAM (not shown) that is used to store data and as a work area for executing programs, and the like. The ECU 100 is connected to the master pressure sensors 48, the wheel cylinder pressure sensors 44, the accumulator pressure sensor 51, and the stroke sensor 46, and receives detection results output from each of these sensors. The ECU 100 is also connected to the master cutoff valves 22, the pressure increase valves 40, the pressure decrease valves 42, and the pump 34. The ECU 100 controls the wheel cylinder pressure to apply the optimum braking force to each wheel by controlling these devices using the detection results from each of the sensors described above. Therefore, the ECU 100 functions as a valve opening and closing controlling portion that controls the opening and the closing of the master cutoff valves 22, the pressure increase valves 40, and the pressure decrease valves 42.

More specifically, the ECU 100 detects depression and release of the brake pedal 12 using the detection results from the stroke sensor 46 and the master pressure sensors 48. Accordingly, the stroke sensor 46 and the master pressure sensors 48 function as a brake operation detecting portion that detects depression and release of the brake pedal 12.

When depression of the brake pedal 12 is detected, the ECU 100 closes the master cutoff valves 22 to prevent brake fluid from flowing to the right front wheel port and the left front wheel port of the master cylinder 14 through the first brake pressure control line 16 and the second brake pressure control line 18. Also, the ECU 100 sets a target wheel cylinder pressure for each wheel cylinder 20 based on the depression amount of the brake pedal 12 and the other variables related to the state of the vehicle (such as vehicle speed and steering angle). The ECU 100 then opens the pressure increase valves 40 to increase the wheel cylinder pressure to the set target wheel cylinder pressure. Also, when release of the brake pedal 12 is detected, the ECU 100 opens the master cutoff valves 22 as well as the pressure decrease valves 42 to decrease the wheel cylinder pressure.

Because there is a possibility that a brake fluid leak may occur at a caliper or in a brake line or the like, a reservoir switch 60 is provided in the reservoir tank 26 to detect such a leak. This reservoir switch 60 turns on when the brake fluid in the reservoir tank drops to or below a predetermined amount. Therefore, the reservoir switch 60 functions as a brake fluid decrease detecting portion that detects a drop in the brake fluid in the reservoir tank 26.

More specifically, the reservoir switch 60 includes a stator arranged in the brake fluid inside the reservoir tank 26 and fixed to the reservoir tank 26, and a float that floats in the brake fluid in the reservoir tank 26. The stator includes a contact, and the float includes a magnet and a contact. When there is a sufficient amount of brake fluid in the reservoir tank 26, the float floats such that the contact of the stator and the contact of the float are separated and the reservoir switch 60 is off. When the brake fluid in the reservoir tank 26 drops to the predetermined amount, the magnet of the float is attracted to the contact of the stator such that the contacts touch and the reservoir switch 60 turns on. The reservoir switch 60 is connected to the ECU 100 and outputs an ON signal thereto. The reservoir switch 60 is not limited to this structure, e.g., a sensor using a Hall IC or other switch structures or the like may be used instead.

The reservoir tank 26 supplies brake fluid to the pump 34 as well as to the right front wheel port and the left front wheel port of the master cylinder 14. With the reservoir tank 26 according to the first example embodiment, brake fluid is first supplied to the pump 34. If there is a fluid leak in a caliper or the like, for example, the amount of brake fluid that will return to the reservoir tank 26 will be less. In this case, because brake fluid is first supplied to the pump 34, less brake fluid may end up being supplied to the right front wheel port and the left front wheel port of the master cylinder 14. If the amount of brake fluid in the master cylinder 14 decreases in this way, it may affect the depression feeling of the brake pedal 12.

Therefore, if the reservoir switch 60 detects a drop in the brake fluid in the reservoir tank 26, the ECU 100 executes a control to supply brake fluid to the master cylinder 14, in which the ECU 100 opens the master cutoff valves 22 to supply brake fluid to the master cylinder 14 from the right front-wheel wheel cylinder 20FR and the left front-wheel wheel cylinder 20FL when release of the brake pedal 12 is detected. The routine for executing this control to supply brake fluid to the master cylinder will now be described in detail with reference to FIG. 2.

FIG. 2 is a flowchart illustrating the routine for the control to supply brake fluid to the master cylinder 14 according to the first example embodiment. When the detection values of the master pressure sensors 48 exceed a brake determining value Bth, the brake control system 10 determines that the brake pedal 12 is being depressed by the driver and closes the master cutoff valves 22 and opens the pressure increase valves 40 to increase the wheel cylinder pressure. The routine in this flowchart of FIG. 2 is repeatedly executed at predetermined intervals of time when it is determined that the brake pedal 12 is being depressed and the master cutoff valves 22 are closed.

The ECU 100 determines whether the application of braking force is being cancelled using the detection results from the stroke sensor 46 and the master cylinder sensors 48 (step S10). The phrase "application of braking force is being cancelled" refers to when, after it has been determined that the brake pedal 12 has been depressed and the wheel cylinder pressure has increased so that it is higher than it is normally, i.e., higher than when the brake pedal 12 is not being depressed, it is then determined whether the brake pedal 12 has been released and the wheel cylinder pressure is dropping to the normal pressure. If the brake pedal 12 is still being depressed and thereby the braking force is not being canceled (i.e., N in step S10), this cycle of the routine in the flowchart ends.

If, on the other hand, the application of braking force is being cancelled (i.e., Y in step S10), the ECU 100 determines whether the reservoir switch 60 is on or off (step S12). If the reservoir switch 60 is off (i.e., N in step S12), that indicates there is a sufficient amount of brake fluid in the reservoir tank 26 so this cycle of the routine in the flowchart ends.

If, on the other hand, the reservoir switch 60 is on (i.e., Y in step S12), that indicates the brake fluid in the reservoir tank 26 is getting low so a sufficient amount of brake fluid may not be able to be supplied to the master cylinder 14 from the reservoir tank 26. Accordingly, the ECU 100 first determines, using the detection results from the right front-wheel wheel cylinder pressure sensor 44FR and the left front-wheel wheel cylinder pressure sensor 44FL, whether the wheel cylinder pressure in the right front-wheel wheel cylinder 20FR and the left front-wheel wheel cylinder 20FL is equal to or less than a first pressure threshold value Pth in order to supply brake fluid to the reservoir tank 26 from the wheel cylinders 20 (step S14). In this first example embodiment, the first pressure threshold value Pth may be set at 0.2 MPa.

If the master cutoff valves 22 are opened while there is still wheel cylinder pressure in the right front-wheel wheel cylinder 20FR and the left front-wheel wheel cylinder 20FL, brake fluid will flow in the first and second brake pressure control lines 16, 18 and be sensed by the master pressure sensors 48. During the brief period until brake fluid flows out of the first brake pressure control line 16 and the second brake pressure control line 18 into the master cylinder 14 at this time, the fluid pressure detected by the master pressure sensors 48 may become higher than the actual pressure in the right front wheel port and the left rear wheel port of the master cylinder 14. If the master pressure sensors 48 detect pressure exceeding the brake determining value Bth in this way, the ECU 100 will determine that the driver is depressing the brake pedal 12 and so will close the master cutoff valves 22. However, because the brake pedal 12 is not actually being depressed, the ECU 100 will quickly open the master cutoff valves 22 again and thus will end up hunting.

Therefore, if the wheel cylinder pressure has not dropped to the first pressure threshold value Pth (i.e., N in step S14), this cycle of the routine in the flowchart ends without the master cutoff valves 22 being opened. If, on the other hand, the wheel cylinder pressure has dropped to the first pressure threshold value Pth or lower (i.e., Y in step S14), the ECU 100 opens the master cutoff valves 22 (step S16). Opening the master cutoff valves 22 after the wheel cylinder pressure has decreased in this way makes it possible to suppress a sudden rise in fluid pressure in the first and second brake pressure control lines 16, 18 around the master pressure sensors 48.

Also at this time, the ECU raises the brake determining value Bth for a predetermined period of time (step S18). As one example, the ECU 100 may raise the brake determining value Bth from 0.05 MPa to 0.3 MPa for 0.6 seconds after determining that the wheel cylinder pressure has dropped to the first pressure threshold value Pth or lower. This is done because even if the master cutoff valves 22 are opened after the wheel cylinder pressure has dropped, as described above, there is still a possibility that the fluid pressure around the master pressure sensors 48 may rise. Raising the brake determining value Bth for a predetermined period of time in this way makes it possible to avoid the hunting described above.

In this way, supplying brake fluid from the right front-wheel wheel cylinder 20FR and the left front-wheel wheel cylinder 20FL to the master cylinder 14 when the amount of brake fluid in the reservoir tank 26 has dropped makes it possible to suppress a decrease in the amount of brake fluid in the master cylinder 14, thereby suppressing an adverse affect on the brake pedal operability felt by the driver.

A second example embodiment of the invention will now be described. FIG. 3 is a flowchart illustrating a routine for control to supply brake fluid to the master cylinder 14 according to the second example embodiment. The structure of the brake control system in the second example embodiment is the same as that of the brake control system 10 in the first example embodiment so the elements are referred to by the same reference numerals. The routine in the flowchart of FIG. 3 is repeatedly executed at predetermined intervals of time after the ignition switch is turned on.

The ECU 100 first determines whether braking is being performed by determining whether the driver is depressing the brake pedal 12 using the detection results from the stroke sensor 46 and the master pressure sensors 48 (step S30). If braking is being performed (i.e., Y in step S30), the master cutoff valves 22 are not opened so this cycle of the routine in the flowchart ends.

If, on the other hand, braking is not being performed (i.e., N in step S30), then the ECU 100 determines whether a predetermined period of time has passed after the driver has released the brake pedal 12 and the wheel cylinder pressure has returned to the initial value (step S32). The ECU 100 uses a timer to measure the period of time that has passed after the wheel cylinder pressure has returned to the initial value, and makes the above determination based on this measured period of time.

If the predetermined period of time has not passed after application of the braking force has been cancelled (i.e., N in step S32), this cycle of the routine in the flowchart ends. If, on the other hand, the predetermined period of time has passed after application of the braking force has been cancelled (i.e., Y in step S32), the ECU 100 then determines whether the reservoir switch 60 is on or off (step S34). If the reservoir switch 60 is off (i.e., N in step S34), that indicates there is a sufficient amount of brake fluid in the reservoir tank 26 so this cycle of the routine in the flowchart ends.

If, on the other hand, the reservoir switch 60 is on (i.e., Y in step S34), the ECU 100 opens the right front wheel pressure increase valve 40FR and the left front wheel pressure increase valve 40FL and raises the brake determining value Bth for a predetermined period of time (for example 2 to 3 milliseconds in the second example embodiment) (step S36). At this time, the ECU 100 opens the right front wheel pressure increase valve 40FR and the left front wheel pressure increase valve 40FL just slightly so that brake fluid is supplied little by little and not suddenly from the accumulator 50 to the master cylinder 14. Restricting the opening amount of the right front wheel pressure increase valve 40FR and the left front wheel pressure increase valve 40FL in this way makes it possible to avoid a sudden rise in fluid pressure around and thereby sensed by the master pressure sensors 48. The values of the brake determining value Bth before and after it is raised, as well as the reason for raising this brake determining value Bth, are the same as they are in the first example embodiment described above.

The accumulator pressure is normally higher than the master cylinder pressure. Therefore, when brake fluid in the reservoir tank 26 is low (i.e., has decreased), the accumulator pressure can easily be used to supply brake fluid to the master cylinder 14.

While some embodiments of the invention have been illustrated above, it is to be understood that the invention is not limited to these illustrated embodiments. That is, embodiments that suitably combine various elements of the foregoing example embodiments, as well as embodiments that include various modifications to the foregoing example embodiments, such as various changes in design, which may occur to those skilled in the art are also included in scope of the invention.

For example, in a modified example, linear valves are used for the master cutoff valves 22 in the first example embodiment. In step S16 in FIG. 2, the ECU 100 gradually opens these master cutoff valves 22 wider as the wheel cylinder pressure decreases. As a result, it is possible to avoid a sudden flow of brake fluid into the reservoir tank 26 when the master cutoff valves 22 open, and thus avoid a sudden rise in the master cylinder pressure detected by the master pressure sensors 48.

Obviously, numerous modifications and variations of the present invention are possible in light of the above teachings. It is therefore to be understood that within the scope of the appended claims, the invention may be practiced otherwise than as specifically described herein.

The invention claimed is:

1. A brake control system comprising:
   a hydraulic fluid decrease detecting portion that detects a decrease in an amount of hydraulic fluid in a reservoir tank connected to a master cylinder;
   a valve opening and closing controlling portion that switches at least one valve arranged in a hydraulic fluid path between being open and closed, the at least one valve including a master cutoff valve and a pressure increase valve, the master cutoff valve being interposed in a hydraulic fluid path that connects the master cylinder with a wheel cylinder in which a hydraulic pressure of stored hydraulic fluid is higher than a hydraulic pressure of the master cylinder, and the pressure increase valve being interposed in a hydraulic fluid path that connects an accumulator with the wheel cylinder; and
   a brake operation detecting portion including a master cylinder pressure sensor that detects a master cylinder pressure by detecting hydraulic pressure in a hydraulic fluid path from the master cutoff valve to the master cylinder, wherein the valve opening and closing controlling portion determines depression and release of a brake pedal based on the detecting result of the brake operation detecting portion, wherein when the decrease in the amount of hydraulic fluid in the reservoir tank is detected by the hydraulic fluid decrease detecting portion, the valve opening and closing controlling portion opens the master cutoff valve to supply hydraulic fluid to the master cylinder from the wheel cylinder that is connected to the master cutoff valve, wherein when the decrease in the amount of hydraulic fluid in the reservoir tank is not detected by the hydraulic fluid decrease detecting portion, the valve opening and closing controlling portion determines that the brake pedal is being depressed when a master cylinder pressure detected by the master cylinder pressure sensor exceeds a first pressure threshold value, and opens the pressure increase valve to increase a wheel cylinder pressure, and wherein when the decrease in the amount of hydraulic fluid in the reservoir tank is detected by the hydraulic fluid decrease detecting portion, the valve opening and closing controlling portion additionally determines that the brake pedal is being depressed when the master cylinder pressure detected by the master cylinder pressure sensor exceeds a second pressure threshold value that is higher than the first pressure threshold value while the master cutoff valve is open, and opens the pressure increase valve to increase the wheel cylinder pressure.

2. The brake control system according to claim 1, wherein when the decrease in the amount of hydraulic fluid in the reservoir tank is detected by the hydraulic fluid decrease detecting portion, the valve opening and closing controlling portion further opens the master cutoff valve to supply hydraulic fluid to the master cylinder from the wheel cylinder that is connected to the master cutoff valve when release of the brake pedal is determined.

3. The brake control system according to claim 2, wherein the at least one valve further includes a pressure decrease valve, which is interposed in a hydraulic fluid path that connects the reservoir tank with the wheel cylinder, and the valve opening and closing controlling portion opens the pressure decrease valve to decrease the wheel cylinder pressure when release of the brake pedal is determined, and wherein when the decrease in the amount of hydraulic fluid in the reservoir tank is detected by the hydraulic fluid decrease detecting portion, the valve opening and closing controlling portion additionally opens the master cutoff valve when release of the brake pedal is determined and a wheel cylinder pressure sensor detects that the wheel cylinder pressure drops to a predetermined pressure threshold value.

4. The brake control system according to claim 1, wherein the master cutoff valve is a linear valve.

5. The brake control system according to claim 3, wherein the wheel cylinder pressure sensor detects the wheel cylinder pressure by detecting the hydraulic pressure in a hydraulic fluid path from the master cutoff valve to the wheel cylinder, wherein the master cutoff valve is a linear valve, and when the decrease in the amount of hydraulic fluid in the reservoir tank is detected by the hydraulic fluid decrease detecting portion, the valve opening and closing controlling portion gradually opens the master cutoff valve wider as the wheel cylinder pressure detected by the wheel cylinder pressure sensor decreases when release of the brake pedal is determined and the wheel cylinder pressure sensor detects that the wheel cylinder pressure drops to the predetermined pressure threshold value.

6. A brake control system comprising:

means for detecting a decrease in an amount of hydraulic fluid in a reservoir tank connected to a master cylinder;

means for switching at least one valve interposed in a hydraulic fluid path between being open and closed, the at least one valve including a master cutoff valve and a pressure increase valve, the master cutoff valve being interposed in a hydraulic fluid path that connects the master cylinder with a wheel cylinder in which a hydraulic pressure of stored hydraulic fluid is higher than a hydraulic pressure of the master cylinder, and the pressure increase valve being interposed in a hydraulic fluid path that connects an accumulator with the wheel cylinder; and means for detecting a brake operation including a master cylinder pressure sensor that detects a master cylinder pressure by detecting hydraulic pressure in a hydraulic fluid path from the master cutoff valve to the master cylinder, wherein the means for switching determines depression and release of a brake pedal based on the detecting result of the means for detecting the brake operation, wherein when the decrease in the amount of hydraulic fluid in the reservoir tank is detected by the means for detecting the decrease in the amount of hydraulic fluid, the means for switching opens the master cutoff valve to supply hydraulic fluid from the wheel cylinder that is connected to the master cutoff valve to the master cylinder, wherein when the decrease in the amount of hydraulic fluid in the reservoir tank is not detected by the means for detecting the decrease in the amount of hydraulic fluid, the means for switching determines that the brake pedal is being depressed when a master cylinder pressure detected by the master cylinder pressure sensor exceeds a first pressure threshold value, and opens the pressure increase valve to increase a wheel cylinder pressure, and wherein when the decrease in the amount of hydraulic fluid in the reservoir tank is detected by the means for detecting the decrease in the amount of hydraulic fluid, the means for switching additionally determines that the brake pedal is being depressed when the master cylinder pressure detected by the master cylinder pressure sensor exceeds a second pressure threshold value that is higher than the first pressure threshold value while the master cutoff valve is open, and opens the pressure increase valve to increase the wheel cylinder pressure.

7. A brake control method comprising:

detecting a decrease in an amount of hydraulic fluid in a reservoir tank connected to a master cylinder;

determining depression and release of a brake pedal;

switching at least one valve arranged in a hydraulic fluid path between open and closed, the at least one valve including a master cutoff valve and a pressure increase valve, the master cutoff valve being interposed in a hydraulic fluid path that connects the master cylinder with a wheel cylinder in which a hydraulic pressure of stored hydraulic fluid is higher than a hydraulic pressure of the master cylinder, and the pressure increase valve being interposed in a hydraulic fluid path that connects an accumulator with the wheel cylinder;

detecting a master cylinder pressure by detecting hydraulic pressure in a hydraulic fluid path from the master cutoff valve to the master cylinder;

when the decrease in the amount of hydraulic fluid in the reservoir tank is detected, opening the master cutoff valve to supply hydraulic fluid to the master cylinder from the wheel cylinder that is connected to the master cutoff valve;

when the decrease in the amount of hydraulic fluid in the reservoir tank is not detected, determining that the brake pedal is being depressed when a master cylinder pressure exceeding a first pressure threshold value is detected, and opening the pressure increase valve to increase a wheel cylinder pressure; and when the decrease in the amount of hydraulic fluid in the reservoir tank is detected, additionally determining that the brake pedal is being depressed when the master cylinder pressure exceeding a second pressure threshold value that is higher than the first pressure threshold value is detected while the master cutoff valve is open, and opening the pressure increase valve to increase the wheel cylinder pressure.

8. The brake control method according to claim 7, further comprising:

when the decrease in the amount of hydraulic fluid in the reservoir tank is detected, additionally opening the master cutoff valve to supply hydraulic fluid to the master cylinder from the wheel cylinder that is connected to the master cutoff valve when release of the brake pedal is determined.

9. The brake control method according to claim 8, wherein the at least one valve further includes a pressure decrease valve, which is interposed in a hydraulic fluid path that connects the reservoir tank with the wheel cylinder, and wherein the method further comprises:

opening the pressure decrease valve to decrease a wheel cylinder pressure when release of the brake pedal is determined, and when the decrease in the amount of hydraulic fluid in the reservoir tank is detected, additionally opening the master cutoff valve when the wheel cylinder pressure drops to a predetermined pressure threshold value.

10. The brake control method according to claim 7, wherein the master cutoff valve is a linear valve.

11. The brake control method according to claim 9, further comprising:

detecting the wheel cylinder pressure by detecting the hydraulic pressure in a hydraulic fluid path from the master cutoff valve to the wheel cylinder; the master cutoff valve being a linear valve; and when a decrease in the amount of the hydraulic fluid in the reservoir tank is detected, gradually opening the master cutoff valve wider as the detected wheel cylinder pressure decreases when release of the brake pedal is determined and the detected wheel cylinder pressure drops to the predetermined pressure threshold value.

* * * * *